United States Patent Office 3,629,419
Patented Dec. 21, 1971

3,629,419
BACTERICIDAL AND FUNGICIDAL N-[(HALO-ALKYL)THIO] - 1,2 - PYRIDAZINE-CARBOXIMIDE COMPOSITIONS AND METHODS OF USE
Malcolm W. Moon, Kalamazoo, Mich., assignor to The Upjohn Company, Kalamazoo, Mich.
No Drawing. Original application Apr. 14, 1967, Ser. No. 632,147, now Patent No. 3,528,978, dated Sept. 15, 1970. Divided and this application June 13, 1969, Ser. No. 834,934
Int. Cl. A01n 9/22
U.S. Cl. 424—250
14 Claims

ABSTRACT OF THE DISCLOSURE

Certain new N-[(haloalkyl)thio]-1,2-pyridazinedicarboximides are active against fungi, bacteria, algae, and protozoa. The pyridazine ring may be tetrahydro or 3,6-dihydro. The invention contemplates alkyl substituents of from 1 to 4 carbon atoms in the 3 and 6 positions of the pyridazine ring. The haloalkyl group may be methyl or ethyl with chlorine, bromine or fluorine substitution. The apple scab fungus, Venturia inaequalis, and the bean rust fungus, Uromyces phaseoli, have been controlled.

CROSS-REFERENCE TO RELATED APPLICATION

This application is a division of application Ser. No. 632,147, Apr. 14, 1967, now U.S. Pat. No. 3,528,978, Sept. 15, 1970.

SUMMARY OF THE INVENTION

This invention pertains to new organic chemical compounds to new microbiocidal compositions, and to a new method for controlling microbes. The invention is more particularly directed to new N-[(haloalkyl)thio]-1,2-pyridazinedicarboximides, to new microbiocidal compositions containing the same, and to a new method of controlling microbes such as fungi and bacteria with the new compounds.

The new N-[(haloalkyl)thio]-1,2-pyridazinedicarboximides of this invention have the structural formulas:

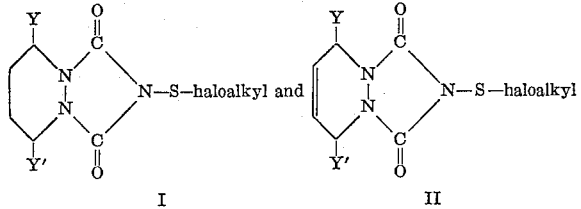

The compounds of Formula I are 3,4,5,6-tetrahydro-N-[(haloalkyl)thio]-1,2-pyridazinedicarboximides wherein Y and Y' are hydrogen or lower-alkyl of from 1 to 4 carbon atoms, inclusive, and "haloalkyl" is 1 or 2 carbon atoms with at least 2, preferably 3 or 4, halogen atoms.

The compounds of Formula II are 3,6 - dihydro-N-[(haloalkyl)thio] - 1,2 - pyridazinedicarboximides wherein Y, Y' and "haloalkyl" are as defined above.

It has been found that the N-[(haloalkyl)thio]-1,2-pyridazinedicarboximides of this invention are active against microorganisms. The compounds are particularly active against fungi and bacteria. Illustratively, the apple scab fungus, Venturia inaequalis, and a bean rust fungus Uromyces phaseoli are controlled with 3,6-dihydro-N-[(trichloromethyl)thio] - 1,2 - pyridazinedicarboximide. The compound is also active against the fungi Botrytis cinerea, Fusarium oxysporum, Fusarium solani, F. phaseoli, Monolinia fructicola, Pythium ultimum, Rhizoctonia solani, Stemphyllium species, Erysiphe cichoracearum, Verticillium albo-atrum, Cytospora species, Cryptococcus neoformans, Piricularia oryzae, and Trichophyton violaceum. The compound is active against bacteria, for example Erwinia amylovora, Pseudomonas phaseolicola, and Xanthomonas vesicatoria. The compounds of this invention can be used, therefore, to control both bacteria and fungi.

In accordance with the invention, the novel N-[(haloalkyl)thio]-1,2-pyridazinedicarboximides can be used in the novel compositions of the invention to control fungal and bacterial growth on organic matter such as wood, cellulosic fibers, seeds, fruits, and vegetables; living plants; soil; and on animals such as fish, reptiles, birds, cattle, horses, dogs, cats, and other animals. The invention includes, therefore, new compounds, new compositions, and a new method for controlling fungi and bacteria in general as well as specific fungi and bacteria that are pathogenic to seeds, plants, and animals.

DETAILED DESCRIPTION

The new N-[(haloalkyl)thio] - 1,2 - pyridazinedicarboximides of this invention, compounds of Formulas I and II, are prepared by reacting a haloalkylsulfenyl halide, preferably a chloride, with an alkali metal salt of a 3,4,5,6 - tetrahydro-1,2-pyridazinedicarboximide or of a 3,6-dihydro - 1,2 - pyridazinedicarboximide, respectively. The reaction is advantageously effected in an aqueous medium, preferably an aqueous solution of an alkali metal hydroxide (e.g., sodium or potassium hydroxide) so as to form the alkali metal salt of the dicarboximide in situ. However, a preformed alkali metal salt of a dicarboximide can be used if desired. Heat is evolved by the reaction of the alkali metal-imide salt and the haloalkylsulfenyl halide, so the reactants should be mixed slowly accompanied by thorough stirring. The temperature of the reaction mixture is conveniently kept at about 0° C., but temperatures as low as about −10° C. and as high as about 30° C. can be used. At the higher temperature, the reactants should be mixed more slowly. In general, about equimolar amounts of each reactant can be used, but an excess of either reactant can be used, if desired.

The N - [(haloalkyl)thio]-1,2-pyridazinedicarboximide product separates from the aqueous reaction mixture or can be precipitated by the addition of organic media, for example, petroleum ether (preferred), acetone, benzene, and the like. It can be purified by collecting on a filter, washing the filter cake to remove any alkali metal halides and unreacted starting materials, and recrystallizing. Suitable recrystallizing solvents include petroleum ether, benzene, ethanol, and acetone; and mixtures of benzene and petroleum ether, acetone and petroleum ether, and the like.

Alternatively, the compounds of Formulas I and II can be prepared by suspending an anhydrous alkali metal salt of a 3,4,5,6-tetrahydro-1,2-pyridazinedicarboximide or of a 3,6-dihydro-1,2-pyridazinedicarboximide in an inert reaction medium, e.g., benzene, toluene, and the like and heating to about 50° to 80° C. in the presence of a selected haloalkylsulfenyl halide. After the reaction is completed, the reaction mixture is cooled and filtered, and the filtrate is concentrated in order to obtain the desired compound.

The starting 3,6-dihydro - 1,2 - pyridazinedicarboximides are readily prepared by condensing an alkadiene having conjugated double bonds with azodicarboxamide to give a 1,2-dicarbamyl - 1,2,3,6 - tetrahydropyridazine which is heated at temperatures above about 250° C. to form the desired imide. The details of synthesis are described in U.S. Patent No. 2,813,866 issued Nov. 19, 1957.

The starting 3,4,5,6 - tetrahydro - 1,2-pyridazinedicarboximides are prepared by reducing the 4,5-double bond of the foregoing 3,6 - dihydro - 1,2 - pyridazinedicarboximides. The desired reduction is accomplished by any of the conventional methods for reducing carbon to carbon double bonds (see Preparation 1).

Reduction can be accomplished, for example, using hydrogen in the presence of a metal catalyst. Advantageously, the reduction is effected with hydrogen in the presence of a noble metal catalyst, for example platinum, palladium, rhodium and the like; although base metal catalysts can be used, for example, Raney nickel, Raney cobalt, and the like can be used.

In general, satisfactory hydrogenations are accomplished using the following conditions: (1) hydrogen gas under about 15 lbs. to about 50 to 60 lbs. pressure, (2) the catalyst (preferably palladium), (3) temperatures in the range of about 10° C. to about 100° C. (preferably about 25° C.), and (4) a solvent, advantageously, dilute aqueous sodium hydroxide. In general, the hydrogenation proceeds readily and is essentially completed in about 15 mins. to about 3 hrs. when, for example, palladium catalyst, hydrogen pressures of about 45 to 60 lbs. and a temperature of about 25° C. are employed.

The 3,4,5,6 - tetrahydro - 1,2-pyridazinedicarboximide product is recovered from the hydrogenation reaction mixture by conventional methods, e.g., filtration to remove the catalyst, concentration, and acidification. The product can be isolated in pure form by crystallization from a suitable solvent, e.g., ethanol; by partition between two immiscible solvents; by chromatography; or by a combination of these purification techniques.

PREPARATION 1

*3,4,5,6-tetrahydro-1,2-pyridazinedicarboximide*

A quantity (15.0 gm., 0.1 mole) of 3,6-dihydro-1,2-pyridazinedicarboximide was dissolved in 100 ml. 1 N aqueous sodium hydroxide and the solution was diluted with 200 ml. water. After adding 1.5 gm. 10% palladium on charcoal, the reaction mixture was hydrogenated at a pressure of 50 p.s.i. (pounds per square inch) and at a temperature of 25° C. for 2½ hrs. The hydrogenated reaction mixture was then filtered to remove the catalyst, and the filtrate was concentrated to a relatively small volume by evaporating the water under reduced pressure. The concentrate was acidified with concentrated hydrochloric acid. A precipitate that formed was collected on a filter and recrystallized from ethanol to give the 3,4,5,6 - tetrahydro - 1,2 - pyridazinedicarboximide melting at 179° to 181° C.

*Analysis.*—Calc'd for $C_6H_9N_3O_2$ (percent): C, 46.44; H, 5.85; N, 27.08. Found (percent): C, 46.37; H, 5.97; N, 27.41.

In the same manner, 3,6-dihydro - 3,6-dimethyl-1,2-pyridazinedicarboximide, 3,6 - dihydro - 3,6 - dipropyl-1,2 - pyridazinedicarboximide, 3,6 - dihydro-3-butyl-1,2-pyridazinedicarboximide, and 3,6 - dihydro - 3-ethyl-1,2-pyridazinedicarboximide are hydrogenated to form the corresponding 3,4,5,6 - tetrahydro - 3,6 - dimethyl-1,2-pyridazinedicarboximide, 3,4,5,6 - tetrahydro - 3,6 - dipropyl - 1,2 - pyridazinedicarboximide, 3,4,5,6 - tetrahydro-3-butyl - 1,2 - pyridazinedicarboximide, and 3,4,5,6-tetrahydro-3 - ethyl - 1,2 - pyridazinedicarboximide, respectively.

Representative haloalkylsulfenyl halides include trichloromethylsulfenyl chloride (preferred), 1,1,2,2 - tetrachloroethylsulfenyl chloride, fluorodichloromethylsulfenyl chloride, 2,2,2 - trichloroethylsulfenyl chloride, 1,2,2 - trichloroethylsulfenyl chloride, bromochlorofluoromethylsulfenyl chloride, bromodichloromethylsulfenyl chloride, dichloromethylsulfenyl chloride, and chlorodifluoromethylsulfenyl chloride.

As indicated, the substituents Y and Y' in Formulas I and II can be hydrogen or lower-alkyl. The contemplated scope of "lower-alkyl" is methyl, ethyl, propyl, butyl, and isomeric forms thereof.

The novel N - [(haloalkyl)thio] - 1,2 - pyridazinedicarboximides of this invention (compounds according to Formulae I and II) are formulated as fungicides and bactericides with solid and liquid carriers with or without adjuvants. The compounds can be used in pure form, but generally the interest of economy is best served by the formulations of the invention. The pure active compounds or the formulations can be applied to bacteria, fungi, objects, or situs for preventing fungal and bacterial growths. The microbiocidal formulations of this invention include dispersions in powder and granular carriers, i.e., dusts and granules; dispersions in liquid carriers, i.e., true solutions, suspensions and emulsifiable concentrates; smokes and aerosols; emulsions, i.e. creams and ointments; and capsules and tablets.

The N-[(haloalkyl)thio] - 1,2 - pyridazinedicarboximides of this invention are solids, and they can be readily formulated as dusts by grinding a mixture of the compound and a pulverulent carrier in the presence of each other. Grinding is conveniently accomplished in a ball mill, a hammer mill, or by air-blast micronization. A suitable ultimate particle size is less than 60 microns. Preferably, 95% of the particles are less than 50 microns, and about 75% are 5 to 20 microns. Dusts of that degree of comminution are conveniently free-flowing and can be applied to animals, inanimate matter, fruit trees, crop plants, and soil so as to effect thorough distribution and coverage. Dusts are particularly adapted for effectively controlling plant fungi over wide areas when applied by airplane. They are also indicated for application to the undersides of plant foliage and to the skin of hairy animals.

Representative suitable pulverulent carriers include the natural clays such as China, Georgia, Barden, attapulgus, kaolin, and bentonite clays; minerals in their natural forms as they are obtained from the earth such as talc, pyrophyllite, quartz, diatomaceous earth, fuller's earth, chalk, rock phosphates and sulfates, calcium carbonates, sulfur, silica and silicates; chemically modified minerals such as washed bentonite, precipitated calcium phosphate, precipitated calcium carbonate, precipitated calcium silicate, synthetic magnesium silicate, and colloidal silica; and organic flours such as wood, walnut shell, soybean, cottonseed, and tobacco flours, and free-flowing, hydrophobic starches.

Dusts can also be prepared by dissolving the N-[(haloalkyl)thio]-1,2-pyridazinedicarboximide in a volatile solvent such as methylene chloride, mixing the solution with a pulverulent carrier and evaporating the solvent.

The proportions of pulverulent carrier and N-[(haloalkyl)thio]-1,2-pyridazinedicarboximide can vary over a wide range depending upon the microbes to be controlled and the conditions of treatment. In general, dust formulations can contain up to about 90% (on a weight basis) of the active ingredient. Dusts having as little as 0.001% of the active ingredient can be used, but a generally preferred proportion is from about 0.50% to about 20% of active ingredient.

The dispersible powder formulations of this invention are prepared by incorporating a surfactant in a dust composition prepared as described above. When about 0.1% to about 12% of a surfactant is incorporated in a dust, the dispersible powder thus obtained is particularly adapted for further admixture with water for spraying on inanimate matter and products, fruit trees, field crops, soil, and livestock. The dispersible powders can be admixed with water to obtain any desired concentration of active ingredient; and the mixture can be applied in amounts sufficient to obtain predetermined rates of application and uniform distribution. With this flexibility in mind, the dispersible powders of the invention can conveniently comprise preferably about 10% to about 80% of active ingredient.

Representative surfactants useful for preparing dispersible powder formulations of this invention include alkyl sulfates and sulfonates, alkyl aryl sulfonates. sulfosuccinate esters, polyoxyethylene sulfates, polyoxyethylenesorbitan monolaurate. alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. The preferred class of surfactants includes blends of sulfonated oils and polyalcohol carboxylic acid esters (Emcol H–77), blends of polyoxyethylene ethers and oil-soluble sulfonates (Emcol H–400), blends of alkyl aryl sulfonates and alkylphenoxy polyethoxy ethanols (Tritons X–151, X–161, and X–171), e.g., about equal parts of sodium kerylbenzene sulfonate and isooctylphenoxy polyethoxy ethanol containing about 12 ethoxy groups, and blends of calcium alkyl aryl sulfonates and polyethoxylated vegetable oils (Agrimul N₄S). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 327 lbs. of Georgia clay, 4.5 lbs. of isooctylphenoxy polyethoxy ethanol (Triton X–100) as a wetting agent, 9 lbs. of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified):

| | Percent |
|---|---|
| Active ingredient | 25 |
| Isooctylphenoxy polyethoxy ethanol | 1 |
| Polymerized sodium salt of substituted benzoid long-chain sulfonic acid | 2 |
| Georgia clay | 72 |

This formulation, when dispersed in water at the rate of 10 lbs. per 100 gals., gives a spray formulation containing about 0.3% (3000 p.p.m.) active ingredient which can be applied to soil, plant growth media, or turf at the rate of 40 gals. per acre to give a total application of active ingredient of 1 lb. per acre.

If desired, dispersants such as methyl cellulose, polyvinyl alcohol, sodium ligninsulfonates, and the like can be included in the dispersible powder formulations of this invention. Adhesive or sticking agents such as vegetable oils, naturally occurring gums, casein, and others can also be included. Corrosion inhibitors such as epichlorohydrin and anti-foaming agents such as stearic acid can also be included.

The granular formulations according to this invention are prepared by permeating a granular carrier with a solution of N-[(haloalkyl)thio]-1,2-pyridazinedicarboximide and then drying the granules. Suitable granular carriers inlude vermiculite, pyrophyllite, and attapulgite. Suitable solvents include acetone, methyl ethyl ketone, and methylene chloride. A solution of an N-[(haloalkyl)thio]-1,2-pyridazinedicarboximide is sprayed on a granular carrier while the carrier is being mixed and tumbled. The granules are then dried. The granules can range in size from about 10 to about 60 mesh, preferably about 30 to about 60 mesh.

The compounds of this invention can be applied to fungi, bacteria, objects, or situs in aqueous sprays without a solid carrier. Since, however, the compounds themselves are relatively insoluble in water they are preferably dissolved in a suitable inert organic solvent carrier. Advantageously, the solvent carrier is immiscible with water so that an emulsion of the solvent carrier in water can be prepared. If, for example a water-miscible solvent carrier such as ethanol is used the solvent carrier will dissolve in the water and any excess N-[(haloalkyl)thio]-1,2-pyridazinedicarboximide will be thrown out of solution. In an oil-in-water emulsion, the solvent phase is dispersed in the water phase and the dispersed phase contains the active ingredient. In this way, uniform distribution of a water insoluble active ingredient is achieved in an aqueous spray. A solvent carrier in which the compounds are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for preventing fungal and bacterial growths.

The emulsifiable concentrates of the invention are prepared, therefore, by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene, and xylene, and high boiling petroleum hydrocarbons such as kerosene, diesel oil, and the like. If desired, a cosolvent such as methyl ethyl ketone, acetone, isopropanol, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed, if desired.

Advantageously, the concentration of active ingredient in the emulsifiable concentrates can range from about 5% to about 50% by weight, preferably from about 10% to about 40%. A concentrate comprising 20% (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20% concentrate mixed with 40 gals. of water provides about 1200 p.p.m. (parts per million) of active ingredient. In the same manner, more concentrated solutions of active ingredient can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium ligninsulfonate, and the like.

The rates of application to fungi, bacteria, objects, or situs will depend upon the species of microbes to be controlled, the presence or absence of desirable living organisms, temperature conditions of treatment, and the method and efficiency of application. In general, fungicidal activity is obtained when the compounds are applied at concentrations of about 10 to about 6000 p.p.m., preferably at concentrations of about 100 to about 1200 p.p.m.

The compositions containing N-[(haloalkyl)thio]-1,2-pyridazinedicarboximides according to the invention, can be applied by conventional methods to fungi, bacteria, objects or any situs where control of fungi and bacteria is desired. For example, an area of soil or plants can be treated by spraying wettable powder suspensions, emulsions, or solutions from boom-type power sprayers or from hand-operated knapsack sprayers. Dusts can be applied by power dusters, or by hand-operated dusters. Creams and ointment formulations can be applied to skin or objects for prolonged protection against microorganisms.

The compounds of Formulas I and II are active against algae, for example, *Chlorella vulgaris*, and protozoa, for example, *Ochromonas danica*.

The following examples are illustrative of the process and products of the present invention, but are not to be construed as limiting.

EXAMPLE 1

*Preparation of 3,6-dihydro-N-[(trichloromethyl)-thio]-1,2-pyridazinedicarboximide*

Trichloromethylsulfenyl chloride (3.0 gm., 0.016 mole) was added dropwise with stirring to a chilled solution of 3,6-dihydro-1,2-pyridazinedicarboximide (2.0 gm., 0.013 mole) in 13 ml. 1 N aqueous sodium hydroxide. The reaction mixture was stirred for 1 hr. at 0° C., and the precipitate that had formed was collected on a filter. The filter cake was dissolved in hot ethanol and the solution was chilled. The crystals of 3,6-dihydro-N-[(trichloromethyl)thio]-1,2-pyridazinedicarboximide that separated were collected on a filter and recrystallized from a mixture of benzene and petroleum ether. The latter crystals melted at 141° to 143° C.

*Analysis.*—Calc'd for $C_7H_6Cl_3N_3O_2S$ (percent): C, 27.79; H, 2.00; Cl, 35.16; N, 13.89; S, 10.60. Found (percent): C, 28.09; H, 2.15; Cl, 35.43; N, 13.76; S, 10.51.

Following the same procedure but substituting fluorodichloromethylsulfenyl chloride, 2,2,2-trichloroethylsulfenyl chloride, 1,2,2-trichloroethylsulfenyl chloride, dichloromethylsulfenyl chloride, bromochlorofluoromethylsulfenyl chloride, bromodichloromethylsulfenyl chloride, and chlorodifluoromethylsulfenyl chloride, respectively, for trichloromethylsulfenyl chloride, there are prepared 3,6-dihydro-N-[(fluorodichloromethyl)thio]-1,2-pyridazinedicarboximide;
3,6-dihydro-N-[(2,2,2-trichloroethyl)thio]-1,2-pyridazinedicarboximide;
3,6-dihydro-N-[(1,2,2-trichloroethyl)thio]-1,2-pyridazinedicarboximide;
3,6-dihydro-N-[(dichloromethyl)thio]-1,2-pyridazinedicarboximide;
3,6-dihydro-N-[(bromochlorofluoromethyl)thio]-1,2-pyridazinedicarboximide;
3,6-dihydro-N-[(bromodichloromethyl)thio]-1,2-pyridazinedicarboximide; and
3,6-dihydro-N-[(chlorodifluoromethyl)-thio]1,2-pyridazinedicarboximide, respectively.

EXAMPLE 2

*Preparation of 3,6-dihydro-N-[(1,1,2,2-tetrachloroethyl)thio]-1,2-pyridazinedicarboximide*

1,1,2,2-tetrachloroethylsulfenyl chloride (10.0 ml.) was added dropwise with stirring to a chilled solution of 3,6-dihydro-1,2-pyridazinedicarboximide (10.0 gm., 0.065 mole) in 67 ml. 1 N aqueous sodium hydroxide. After adding 50 ml. petroleum ether and 25 ml. water, the reaction mixture was stirred for 30 min. at 0° C. The precipitate that formed was collected on a filter, and the filter cake was washed with water and with petroleum ether. The washed filter cake was dried and recrystallized from a mixture of benzene and petroleum ether to give 3,6-dihydro-N-[(1,1,2,2-tetrachloroethyl)thio]-1,2 - pyridazinedicarboximide melting at 147° to 149° C. (with decomposition).

*Analysis.*—Calc'd for $C_8H_7Cl_4N_3O_2S$ (percent): C, 27.37; H, 2.01; Cl, 40.40; N, 11.97; S, 9.13. Found (percent): C, 27.58; H, 2.06; Cl, 40.41; N, 12.50; S, 9.19.

EXAMPLE 3

*Preparation of 3,4,5,6-tetrahydro-N-[(trichloromethyl)thio]-1,2-pyridazinedicarboximide*

Trichloromethylsulfenyl chloride (3.5 ml.) was added dropwise with stirring to a chilled solution of sodium 3,4,5,6-tetrahydro-1,2-pyridazinedicarboximide (3.6 gm.) in 20 ml. water. After stirring the reaction mixture for 1 hr. at 0° C., the precipitate that had formed was collected on a filter. The filter cake was washed with water and with petroleum ether. The washed filter cake was dissolved in hot acetone. After cooling, crystals formed. The crystals were collected on a filter and recrystallized from a mixture of benzene petroleum ether to give 3,4,5,6-tetrahydro-N - [(trichloromethyl)thio]-1,2-pyridazinecarboximide that melted at 139° to 141° C.

*Analysis.*—Calc'd for $C_7H_8Cl_3N_3O_2S$ (percent): C, 27.60; H, 2.65; Cl, 34.92; N, 13.80; S, 10.53. Found (percent): C, 27.94; H, 2.71; Cl, 34.93; N, 14.02; S, 10.11.

EXAMPLE 4

Following the procedure of Example 1, but substituting 3,6-dihydro-3,6-dimethyl-1,2-pyridazinedicarboximide, 3,6-dihydro-3,6 - dipropyl-1,2 - pyridazinedicarboximide, and 3,6-dihydro-3-butyl-1,2-pyridazinedicarboximide, respectively, for 3,6-dihydro-1,2-pyridazinedicarboximide, there are prepared 3,6-dihydro-3,6-dimethyl-N-[(trichloromethyl)thio]-1,2-pyridazinedicarboximide, 3,6-dihydro-3,6-dipropyl-N-[(trichloromethyl)thio] - 1,2-pyridazinedicarboximide, and 3,6-dihydro-3-butyl-N-[(trichloromethyl)thio]-1,2-pyridazinedicarboximide, respectively.

EXAMPLE 5

Following the procedure of Example 3, but substituting the sodium salts of 3,4,5,6-tetrahydro-3,6-dimethyl-1,2-pyridazinedicarboximide, 3,4,5,6-tetrahydro - 3,6-dipropyl-1,2-pyridazinedicarboximide, 3,4,5,6-tetrahydro-3-butyl-1,2-pyridazinedicarboximide, and 3,4,5,6-tetrahydro-3-ethyl-1,2-pyridazinedicarboximide for sodium 3,4,5,6-tetrahydro-1,2-pyridazinedicarboximide, there are prepared 3,4,5,6-tetrahydro-3,6-dimethyl-N-[(trichloromethyl)thio]-1,2-pyridazinedicarboximide, 3,4,5,6-tetrahydro-3,6-dipropyl-N-[(trichloromethyl)thio] - 1,2-pyridazinedicarboximide, 3,4,5,6-tetrahydro - 3-butyl-N-[trichloromethyl)thio]-1,2-pyridazinedicarboximide, and 3,4,5,6-tetrahydro-3-ethyl-N - [(trichloromethyl)thio]-1,2-pyridazinedicarboximide, respectively.

I claim:
1. The process for controlling fungi and bacteria which comprises contacting said bacteria and fungi with an an effective amount of an N-[(haloalkyl)thio]-1,2-pyridazinedicarboximide of the formulas:

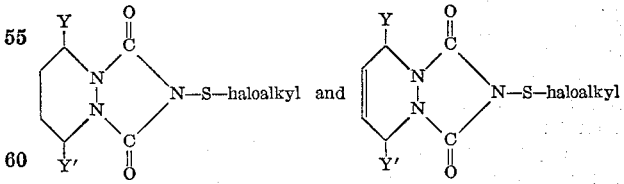

wherein Y and Y' are hydrogen or lower-alkyl of from 1 to 4 carbon atoms, inclusive; and "haloalkyl" is 1 or 2 carbon atoms with at least 2 halogen atoms substituents.

2. The process according to claim 1 wherein "haloallyl" is trichloromethyl.

3. The process according to claim 2 wherein 3,6-dihydro-N-[(trichloromethyl)thio]-1,2 - pyridazinedicarboximide is used.

4. The process according to claim 2 wherein 3,4,5,6-tetrahydro-N-[(trichloromethyl)thio] - 1,2-pyridazinedicarboximide is used.

5. The process according to claim 1 wherein "haloalkyl" is 1,1,2,2-tetrachloroethyl.

6. The process according to claim 5 wherein 3,6-dihydro-N-[(1,1,2,2-tetrachloroethyl)thio] - 1,2-pyridazinedicarboximide is used.

7. The process of controlling apple scab, the fungus *Venturia inaequalis*, which comprises applying 3,6-dihydro-N-[(trichloromethyl)thio] - 1,2-pyridazinedicarboximide to apple trees.

8. Composition for controlling fungi bacteria which comprises a dispersible carrier, and an effective concentration of the active ingredient N-[(haloalkyl)thio]-1,2-pyridazinedicarboximide of the formulas:

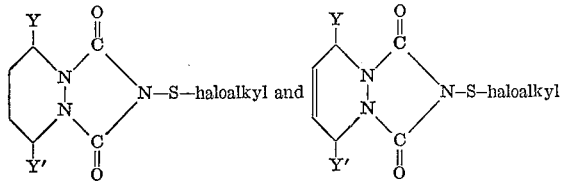

wherein Y and Y' are hydrogen or lower-alkyl of from 1 to 4 carbon atoms, inclusive; and "haloalkyl" is 1 or 2 carbon atoms with at least 2 halogen atoms substituents.

9. The composition according to claim 8 also comprising a surfactant.

10. The composition according to claim 9 wherein "haloalkyl" is trichloromethyl.

11. The composition according to claim 10 wherein the active ingredient is 3,6-dihydro-N-[(trichloromethyl)thio]-1,2-pyridazinedicarboximide.

12. The composition according to claim 10 wherein the active ingredient is 3,4,5,6-tetrahydro-N-[(trichloromethyl)thio]-1,2-pyridazinedicarboximide.

13. Composition according to claim 9 wherein the dispersible carrier is a pulverulent carrier.

14. Composition according to claim 13 wherein there is from 0.001% up to 90% of 3,6-dihydro-N-[(trichloromethyl)thio]-1,2-pyridazinedicarboximide.

References Cited

UNITED STATES PATENTS 2,813,866  11/1957  Clarke _____ 260—250 A
2,813,867  11/1957  Hunter _____ 260—250 A ALBERT T. MEYERS, Primary Examiner
N. A. DREZIN, Assistant Examiner U.S. Cl. X.R.
71—67, 92